Patented June 23, 1931

1,811,177

UNITED STATES PATENT OFFICE

JULIUS HYMAN AND ARTHUR F. SCHLANDT, OF CHICAGO, ILLINOIS, ASSIGNORS TO THE PURE OIL COMPANY, OF CHICAGO, ILLINOIS, A CORPORATION OF OHIO

PROCESS OF TREATING PETROLEUM EMULSIONS

No Drawing.    Application filed March 26, 1929.  Serial No. 350,125.

This invention relates to an improved process for breaking petroleum emulsions, especially those emulsions which are present in oil-fields crudes, and the object of the invention is to provide a process adapted for the purpose of separating effectively and economically the oil content of the emulsion from the other liquids or substances intimately associated therewith in order to render the separated oil suitably for any desired use.

Petroleum emulsions of the character referred to are most frequently found in the crude oils pumped from wells and are also found in the bottoms of oil storage tanks or in other receptacles in which crude oil especially is allowed to stand. These emulsions contain upon analysis varying amounts of oil, water or brine and other compounds foreign to oil. Such emulsions are of a relatively stable character and are difficult to break down and separate into component parts in a quick, economical and practical manner. From a standpoint of nomenclature these emulsions are known in the industry by a variety of names, being frequently referred to as cut oil, roily oil, basic sediment, bottom settling, sludge and B. S.

The removal of oil from emulsions of this character is a source of considerable difficulty and expense to the petroleum producer and it is a principal object of the present invention to treat petroleum emulsions of this type in an effective manner, through the medium of the new agent, to destroy the permanency or stability of the emulsion and cause it to break or separate promptly in order to form separate strata of oil and water or other foreign substances present therein, whereby the oil may be separately collected and placed to its various uses.

The present invention resides largely in the discovery that oxidized motor fuels obtained by the vapor phase cracking of petroleum oils when intimately mixed or bought into contact with said emulsions effects promptly and satisfactorily the destruction of the emulsion and the liberation of the oil content thereof.

Fuel used in the manufacture of the treating agent comprising the present invention is obtained, as previously stated, by the molecular decomposition of petroleum oils wherein the oils while undergoing such decomposition are in the vapor phase and reacting at relatively high temperatures. For example, such fuels are obtainable by passing hydrocarbons of high boiling point, such as kerosene or gas oil fractions in a vaporized condition, through a reaction zone, wherein the oil vapors are heated to temperatures in excess of 1000° F. and while maintained under desired pressures and for appropriate periods of time. Due to these conditions the vapors while passing through the reaction zone violently react to produce compounds of relatively low boiling point, which, upon discharge from the reaction zone, are fractionated and condensed for use as motor fuel spirits or fuel. The condensed product thus obtained has a more or less disagreeable odor, and contains materials dissolved therein which are of a resinous colloidal character. When the fuel evaporates this material remains as a non-drying resinous substance, with a varnish-like odor. This can be removed from the oil together with the color of the oil by subjecting the later, while in the vapor phase and before final condensation, to treatment with fuller's earth, either by filtering or contact operations. The contact of the fuel with fuller's earth results in the separation from the fuel of the color-imparting and gum-forming bodies through polymerization of these compounds which are, of course, undesirable in a motor fuel, the heavier polymerized products or gums being then removed from the treated fuel to render the latter suitable for commercial purposes.

A distinguishing characteristic of this fuel is that it contains a proportion of unsaturated hydrocarbons and a considerable amount of aromatic hydrocarbons, which amount will vary depending upon the various factors, such as the kind of oil treated and the conditions attending the operation of the converter. If the fuel is treated with a small amount of sulphuric acid, in lieu of the fuller's earth method of treatment, a sweet aromatic odor is produced. The fuel contains a certain amount of aromatic hydrocarbons such as benzol and toluol, and also contains considerable amounts of unsaturated hydrocarbons, of the olefine and acetylene series, the amount of such unsaturated portion varying ordinarily between 20% and 50%. The iodin and bromin numbers of the fuel are in accordance therewith.

The boiling point, flash point, distillation table, percentage of unsaturated compounds, percentage of benzol, toluol, etc., amount of acetylene compounds, etc., will depend upon a large number of particular factors, such as the character of charging stock in the converter, the temperature and pressure in the converter, the rate at which the oil is fed through the converter and possibly other factors.

Such motor fuels consisting essentially of hydrocarbon materials and containing aromatic hydrocarbons, open-chain saturated hydrocarbons, olefin hydrocarbons and acetylene hydrocarbons are well known in the industry at the present time and are customarily referred to as vapor phase cracked petroleums. We have discovered that these fuels when oxidized in any suitable manner or the gums obtained through oxidation are admirably suited as agents for breaking down oil-field emulsions. When these products are oxidized by standing or by being brought into contact with oxygen containing gases, a suitable proportion thereof may be mixed mechanically with an emulsion of the character above stated. The treating agent has the ability to attack the droplets of water or brine disposed in suspension in the body of oil under treatment, causing the emulsion to break and allow separate strata of oil, water and other foreign bodies.

What is claimed is:

1. A process for treating petroleum emulsions which consists in introducing into a body of such emulsion a treating agent in the form of a gum obtained through the oxidation of hydrocarbon motor fuels produced by vapor phase cracking and containing a large percentage of unsatuated compounds, to cause the oil in the emulsion to separate from the undesired components of the emulsion and finally drawing off the oil.

2. The process of breaking petroleum oil emulsions, which comprises intermixing therewith compounds containing gums produced by oxidation of unsaturated hydrocarbon motor fuels, and allowing settling to take place to permit of the separation of the oils in the emulsion from the undesired constituents thereof.

3. The method of breaking petroleum oil emulsions, which consists in introducing into such emulsions a treating agent consisting of an oxidized hydrocarbon motor fuel obtained by the molecular decomposition of higher boiling point hydrocarbons and wherein said motor fuel contains a large percentage of unsaturated compounds, whereby to cause the oil in the emulsions under treatment to separate from the undesired constituents present in the emulsion.

4. The process of breaking petroleum oil emulsions, which comprises introducing into a body of such an emulsion a treating agent consisting of an oxidized hydrocarbon motor fuel produced by the molecular decomposition of high boiling point hydrocarbons while the latter are in the vapor phase, allowing the body to stand until the oil therein separates and rises to the top, and finally drawing off the oil.

5. In a process for treating petroleum emulsions, the step of introducing into the emulsion to be treated an emulsion breaking agent in the form of a gum obtained by the resinification of unsaturated hydrocarbons suitable for use as motor fuels so as to break the emulsion and cause the particles of oil to collect together.

In testimony whereof we affix our signatures.

JULIUS HYMAN.
ARTHUR F. SCHLANDT.